US 9,553,454 B2

(12) United States Patent
Beck

(10) Patent No.: US 9,553,454 B2
(45) Date of Patent: Jan. 24, 2017

(54) METHOD AND DEVICE FOR STABILIZING NETWORK OPERATION OF A POWER SUPPLY NETWORK

(75) Inventor: Bernhard Beck, Dimbach (DE)

(73) Assignee: BOB Holding GmbH, Volkach (DE)

( * ) Notice: Subject to any disclaimer, the term of this patent is extended or adjusted under 35 U.S.C. 154(b) by 854 days.

(21) Appl. No.: 13/409,650

(22) Filed: Mar. 1, 2012

(65) Prior Publication Data

US 2012/0223577 A1    Sep. 6, 2012

(30) Foreign Application Priority Data

Mar. 1, 2011    (DE) .................. 10 2011 012 695

(51) Int. Cl.
| H02J 3/38 | (2006.01) |
| H02J 7/34 | (2006.01) |
| H02J 1/10 | (2006.01) |
| H02J 3/16 | (2006.01) |

(52) U.S. Cl.
CPC .................. H02J 3/385 (2013.01); H02J 3/16 (2013.01); *H02J 3/383* (2013.01); *H02J 3/386* (2013.01); *Y02E 10/563* (2013.01); *Y02E 10/58* (2013.01); *Y02E 10/763* (2013.01); *Y02E 40/34* (2013.01); *Y10T 307/305* (2015.04); *Y10T 307/406* (2015.04)

(58) Field of Classification Search
CPC .......... H02J 3/383; H02J 3/386; Y02E 10/563
USPC ........................................................ 307/18
See application file for complete search history.

(56) References Cited

U.S. PATENT DOCUMENTS

| 5,083,039 A | 1/1992 | Richardson et al. |
| 6,924,565 B2 | 8/2005 | Wilkins et al. |
| 2010/0138061 A1 | 6/2010 | Walling et al. |
| 2011/0035077 A1 | 2/2011 | Lee et al. |
| 2011/0066301 A1* | 3/2011 | Donolo ..................... H02J 3/12 700/292 |
| 2011/0106321 A1* | 5/2011 | Cherian .................... H02J 3/00 700/286 |
| 2011/0316337 A1* | 12/2011 | Pelio ..................... H05K 7/1492 307/24 |
| 2012/0130656 A1* | 5/2012 | Bickel ................. H02J 13/0006 702/60 |
| 2012/0205981 A1* | 8/2012 | Varma ....................... H02J 3/01 307/64 |

FOREIGN PATENT DOCUMENTS

| CA | 02460724 A1 | 4/2003 |
| DE | 199 61 705 A1 | 7/2001 |
| EP | 2 175 540 A2 | 4/2010 |
| EP | 2 256 341 A1 | 12/2010 |

* cited by examiner

*Primary Examiner* — Rexford Barnie
*Assistant Examiner* — Toan Vu
(74) *Attorney, Agent, or Firm* — Muncy, Geissler, Olds & Lowe, P.C.

(57) ABSTRACT

For network stabilization of an electric power supply network, the voltage at a first network connection point at a first voltage level to a power generator, and at a second network connection point to a second voltage level, as well as at at least one third network connection point to a load, are each sensed as a voltage measurement, wherein a reactive power draw or a reactive power delivery by the power generator is ascertained using a linkage of the voltage measurements with the geographic location of the relevant network connection point.

10 Claims, 3 Drawing Sheets

METHOD AND DEVICE FOR STABILIZING NETWORK OPERATION OF A POWER SUPPLY NETWORK

This nonprovisional application claims priority under 35 U.S.C. §119(a) to German Patent Application No. DE 10 2011 012 695.3, which was filed in Germany on Mar. 1, 2011, and which is herein incorporated by reference.

BACKGROUND OF THE INVENTION

Field of the Invention

The invention relates to a method for stabilizing network operation of an electric power supply network with a first network connection point at a power generator at a first voltage level, and with a second network connection point connected at a second voltage level (higher-level network), and with a number of third network connection points to particular associated loads. It also relates to a device for carrying out the method.

Description of the Background Art

Power supply network can be understood to mean any network area with which voltage measurements, connection points, inverters, and transformers are associated. This can be a local area, such as the premises of a relatively large company, a town, a big city, or a neighborhood of a city, for example. In this way, any desired infrastructure can be defined as a supply network as long as the minimum required components are present. Such a power supply network, which is connected to an associated higher-level network through a transformer, comprises multiple supply levels, namely a low voltage level up to 1 KV, a medium voltage level between 1 KV and 33 KV, a high voltage level from 33 KV to 220 KV, and an ultra-high voltage level above 220 KV, of which two supply levels customarily are linked.

In the practice of public power supply, the power suppliers or network operators set more or less narrow limits for current and voltage quality with respect to the reactive power component (reactive power draw or reactive power delivery) from power suppliers and power consumers in the power supply network, represented by the cos phi value in the phasor diagram of current and voltage, as a function of supply level. In many cases, including in Germany in particular, the permissible value of cos phi for penalty-free reactive power draw or reactive power injection is 0.95. This measure or limit setting serves to stabilize the networks in order to avoid an overvoltage, which can result in destruction of connected loads, and to avoid an undervoltage, which can cause loads to fail. Price serves to regulate adherence to the cos phi values that have been set. Thus, an injection or a draw of reactive power outside of the range for cos phi specified by the power supplier or higher-level network operator is subject to substantial additional charges.

Systems for generating regenerative power are widely known. Every photovoltaic system (PV system) generates direct current, which is converted into alternating current by means of an inverter, and is fed into a power supply network under suitable conditions. Both purely electronic devices and electromechanical converters can be employed as inverters. The term inverter here should be interpreted to mean all devices that can produce an alternating current from a direct current. Thus, although windpower systems directly generate alternating current, this must be adapted to the conditions of the public power supply network through a frequency converter. These frequency converters also include inverters and should be included in the category of means.

The electronic components of an inverter, as is also the case for the combination of a DC machine with a synchronous generator as a mechanical inverter, permit the establishment of a desired cos phi value with respect to power. In most PV systems, this is accomplished by means of a cos phi indicator, by means of which a fixed ratio of delivered power to delivered or drawn reactive power can be established. Thus, the control unit is required to set a cos phi value of 0.97 for all power delivered to the network, for example.

Known from DE 199 61 705 A1, for example, is an inverter for a photovoltaic system by means of which a solar installation can be connected to a power supply network, and which has a control unit for dynamically calculating a compensation current to compensate harmonics and reactive power in the network. The intent is to improve the network voltage quality in the power supply network through operation of the inverter with the control unit. The control unit calculates a desired compensation current value based on a measured network voltage value. In this design, the measuring element for the network voltage element is arranged at the connection point where the inverter delivers the power to the network.

In relatively large and modern systems, the cos phi value is not necessarily fixed, but instead can be adjusted dynamically in operation using a diagram as shown in FIG. 1 depending on the instantaneous requirements. A cos phi value to be established at the output of the inverter is plotted as a function of network voltage there. The output voltage ($U_{Netz}$) for delivery to the network may only vary within a range between a minimum value ($U_{min}$) and a maximum value ($U_{max}$). The PV system should not be operated outside this range permitted by the power supplier for delivery to the network with a maximum cos phi of, e.g., 0.95. Within this permissible range lies a narrower range between a minimum control voltage ($U_{regel\ min}$) and a maximum control voltage ($U_{regel\ max}$) in which pure power without a reactive power component can be supplied to the network. The nominal voltage ($U_{soll}$) lies in the center of this narrower range.

As a general rule power suppliers, particularly in their contractual relationship to the higher-level network operator (e.g., nuclear power plant, coal-fired power plant, etc.) as electricity vendor, are contractually obligated not to exceed a reactive power draw value of cos phi 0.95, in order to safeguard the voltage stability of the supraregional network. In the example, this means that a cos phi value of 0.94 represents an exceedance of draw, whereas a cos phi value of 0.96 represents a negative exceedance, which is to say an underutilization of the maximum permitted draw. A draw or delivery of reactive power is frequently necessary in the lower-level networks, however, in order to compensate for a voltage rise due to the feed-in of solar and wind power or to compensate for a voltage drop resulting from a dropout in the supply of alternative power generation or from the startup of machinery.

For a more detailed explanation of the problems and the object arising therefrom, an example is discussed with reference to FIG. 2. In a medium voltage supply network at 20 kV, multiple localities A through K of different sizes are supplied with power at an 0.4 KV level through a ring circuit 101 that is connected to two supplying transformers 103 and 103'. The localities A through K are supplied with stable power at the 0.4 KV level. Measures must be taken when one of the transformers, for example the transformer 103', goes offline because of maintenance work or failure and must be disconnected from the network. The remaining transformer 103 must then supply all localities A through K with power.

In order to be able to provide sufficient voltage even at the distant localities E and D, the control room responsible for the supply network must increase the output voltage at transformer 103. For the nearby localities A and K, this means that they are supplied at the upper edge of the desired voltage range. For the distant localities, this means that they are supplied closer to the lower edge of the voltage range. If a relatively large photovoltaic system is located in the locality K, then its control system will attempt to steer the PV system back into region B—as shown in FIG. 1 described above—since the system is being operated in the area of the right edge, which is to say in the region C, because of the increased network voltage. Since the PV system controller is not aware of the offline transformer 103', the result is that the system controller will attempt to reduce the network voltage and the control room will attempt to raise the network voltage, for example by appropriate switching actions on the transformers, in particular by a change in the transformation ratio. These opposing interventions in the power supply network have already resulted in less stable networks on a regular basis, even before regenerative power generators were present at today's levels.

SUMMARY OF THE INVENTION

It is therefore an object of the invention to stabilize the electric network of a public power supplier and in particular to maintain an existing network stability.

This object is attained according to an embodiment of the invention in that the currently prevailing voltage is measured at the first network connection point to the at least one power generator, and at the second network connection point to the second voltage level, hereinafter also called the higher-level network, to which is connected a transformer that is preferably variable in its transformation ratio, as well as at at least one of the additional network connection points for the loads. In addition, the geographic location of the network connection points undergoing voltage measurement is ascertained together with each of their associated voltage measurements. A calculation of a reactive power draw or a reactive power delivery by the power generator takes place as a function of the voltage measurements, taking into account the geographic location thereof, which is to say using a data linkage of the voltage measurements and the geographic location or position of the relevant voltage measurement point. In this way, geographically influenced reactive power management is provided in an especially advantageous manner. The method is especially suitable for application to multiple voltage levels of the power supply network.

In this regard, the invention proceeds from the consideration that a comparatively imprecise knowledge of actual cable lengths, and thus a comparatively imprecise ascertainment of the location of the relevant voltage measurement points, is not only acceptable in reactive power management, but moreover is offset by the advantage that knowledge of the exact cable lengths is not at all necessary in establishing and analyzing the relationships in power supply networks or power grids. If the comparatively imprecise geographic location data of the measurement sites or points, which are known to be sufficient for effective reactive power management, are used instead of the exact cable lengths in the course of reactive power management, knowledge of the cable lengths and conductor cross-section is superfluous.

Moreover, it is not necessary in an expansion or modification of the power supply network to carry out a costly acquisition of new data concerning altered cable lengths or cross-sections and to add these data to a computational model or the like.

The term network connection point can be understood to mean the position of the meter between the load and the network, and between the supplier and the network. In the present case, network connection point is additionally understood to mean any position within the public power supply network and the network of the load and supplier at which the voltage measurement is performed.

The calculation of the reactive power draw or reactive power delivery by the power generator, hereinafter also referred to as power supplier, is accomplished here as a function of the voltage measurements in such a manner that reactive power is drawn from the network when a measured voltage is too high, and that reactive power is fed into the network when a measured voltage is too low. The use of the present method is especially suitable when a regenerative power generator with an inverter is involved and when multiple such power generators or power suppliers are connected to the power supply network through correspondingly associated first network connection points.

Regenerative power generation systems typically are equipped with an electronic or electromechanical inverter, which is a component of PV systems and windpower systems according to the discussions above. These systems or devices have the capability of providing a KVAr contribution because of their components that are inherently present, such as, e.g., IGBTs in the electronic inverters or an excitation current controller in a machine set. Thus, a capability of these systems or devices that is present in any case is used for an additional purpose, namely for stabilization of the power supply network. In general, this occurs with no losses in delivery of real power. An inverter of, e.g., 1 MW (MVA) rated power, which is only loaded with 0.6 MVA because of the existing solar radiation, has a free capacity for injecting or drawing reactive power in the amount of 0.4 MVAr.

In the case of the example described at the outset, this inverter can thus be operated with a capacitive cos phi corresponding to a reactive power injection, suspending its typical regulation scheme according to FIG. 1, in order to contribute to raising the voltage level, instead of attempting to stay within its control range through a voltage reduction.

It is especially advantageous when the geographic distance from a peripherally located load to a voltage measurement connection point, in particular the nearest such point, is ascertained and enters into the calculation of the amount of the reactive power draw or reactive power delivery. In an existing power supply network, the geographic association is fixed at a given point in time under consideration. Thus, when the peripheral load (e.g., a farm) is located at a distance of, e.g., three kilometers (3 km) from the nearest voltage measurement point, the voltage drop along this section is known and unchanged as long as no expansion of the power supply network takes place. This voltage drop along the section then enters into the calculation of the required reactive power draw or reactive power delivery that is necessary to achieve a stable voltage at the load (the farm).

When multiple power generators or power suppliers are present, the power supplier having the shortest distance to the peripheral load is used for reactive power draw or reactive power delivery. This achieves the result that the reactive power delivery does not extend over widely separated network sections, so that the effects on other network connection points are small there.

To facilitate the work in a control room of the supply network, it is useful to supply the voltage measurements to a computing and control unit that is provided for this purpose and is suitable for generating a geographic voltage diagram that is representative of the level of the voltage in the power supply network. The computing and control unit regulates the injection of power and reactive power or the draw of power and reactive power in the power supply network by intervening in the inverter of the at least one power generator. The goal of the control algorithm is that the voltage prevailing in the power supply network does not exceed or drop below a predefinable value at any network connection point.

The voltage relationships in the supply network can be represented in color on a display screen as a geographic voltage diagram. A specific coloring, for example the color red, can identify areas in which the voltage is tending toward the upper limit value, while another color, for example blue, can identify areas whose voltage has established itself at the lower limit value. In a suitable manner, these are regions where an intervention in the reactive power management of the regenerative power generator, and/or possibly in the transformation ratio of the transformer, might be necessary. Another color, for example green, can then identify areas that do not currently require the attention of the operating staff of the control room.

If the transformer that is present cannot be controlled automatically or by remote control with regard to its transformation ratio, it is useful for the computing and control unit to issue a recommendation to the network operator to set an appropriate transformation ratio. The operator can thereupon dispatch a technician to the transformer to adjust the transformation ratio on site mechanically.

To avoid the aforementioned additional charges or surcharges for violation of the higher-level network operator's reactive power specifications, it is useful for the computing and control unit to control the power flow in such a manner that a reactive power transfer at the second network connection point does not exceed a predefinable limit value.

It is advantageous for the management of the inverter to maintain the maximum power point MPP (Maximum Power Point) of the PV system or windpower system by means of the control system therein. Moreover, it is advantageous for the inverter to additionally feed into or draw from the supply level a quantity of reactive power that at a maximum corresponds to the difference between the power currently being delivered and the rated power of the inverter. In this way, the reactive power contribution is limited to the power remaining to achieve the rated power of the inverter. Moreover, the power generated by the power generator itself is not limited or reduced. The free output capacity of the inverter is merely used to fulfill an additional function, namely that of a phase shifter or reactive power supplier.

Provision can also be made for the management of the inverter to provide for feeding into or drawing from the supply level a predefinable reactive power component up to the maximum power point MPP while bypassing the suspension of the control system inherent therein that is required in any case. This makes sense when the prevailing network conditions make it more valuable for the system operator to provide reactive power for stabilizing the network than to provide real power for driving machines, operating air conditioners, or the like.

Within the management of the inverter, a measured undervoltage below a threshold results in an infeed of reactive power on the part of the inverter, whereas an imminent overvoltage, for example when an upper threshold value is reached, results in a reactive power draw by the at least one inverter.

An even wider monitoring according to the invention of the voltage state on the network of the supply level provides for the voltage to be ascertained at the network connection points of multiple loads on the same supply level, and for management to take place using these multiple voltage values. In this way, with knowledge of a plurality of measured voltages and in particular with the presence of multiple regenerative power generators at connection points that are relatively widely separated geographically, optimal management of the network state can be achieved.

When multiple power generators or suppliers of regenerative energy are present, each with its associated network connection point, in the same supply network, it is useful for the reactive power component that is to be supplied to be distributed among the corresponding multiple inverters in such a manner that the participating inverters operate with the lowest possible total loss. Low loss is understood to mean that the largest possible quantity of kilowatt hours can be fed into the network from the regenerative energy supply, for example sun or wind. This permits an efficient utilization of the available reactive power capacities. For the same reason, it is appropriate that the particular power generator is used by preference for reactive power injection or reactive power draw that is spatially adjacent to the network connection point at which the voltage value that is approaching a critical value is ascertained.

In order to protect the inverter and the photovoltaic system from overvoltage damage, the reactive power management provides for the use of a limiter that applies the predefined reactive power quantity reduced in such a manner that a maximum permissible voltage at the output of the inverter is not exceeded. In like manner, it is useful to enable the regulating and/or control device to apply the predefined reactive power quantity increased in such a manner that a minimum permissible voltage at the input of the inverter is not negatively exceeded. The inverters can fulfill a reactive power delivery or a reactive power draw independently of the power P that is currently present. In particular for inverters with photovoltaic modules, this means that the inverters remain constantly on the network and are available for regulation even at night.

An energy storage system in the form of a battery bank, pumped storage power plant, or the like can also be considered a power generator or power supplier. This system can then draw power, or also reactive power, from the relevant voltage level or feed it into the voltage level on request.

It is advantageous if the network operator defines a nominal voltage range for the corresponding network area, for example for known or upcoming maintenance work, which range the computing device or regulating and control unit maintains using its control algorithm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
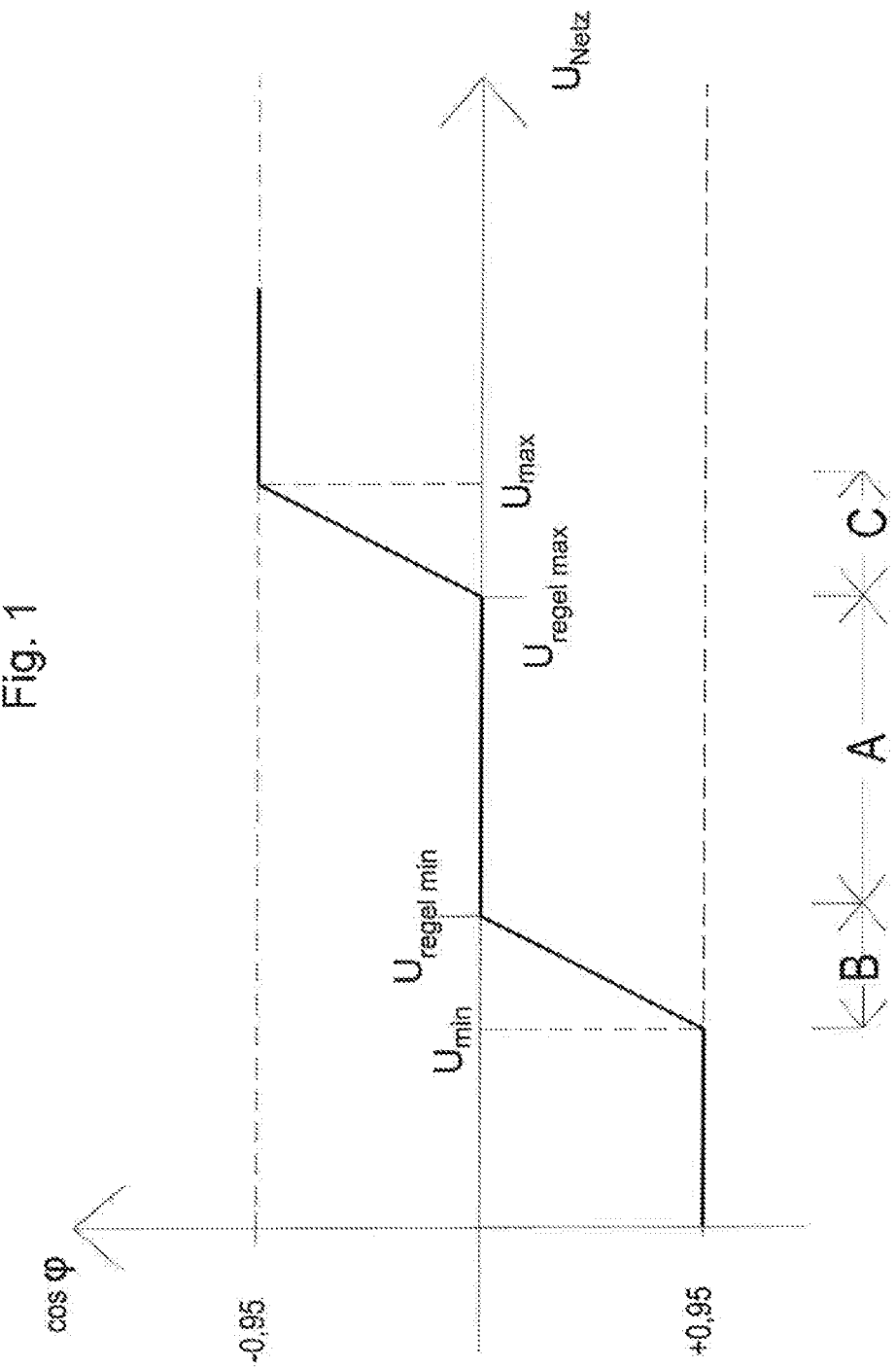
FIG. 1 is a regulation scheme for an inverter of a solar installation to establish a cos phi value through the output voltage.
Figure 2:
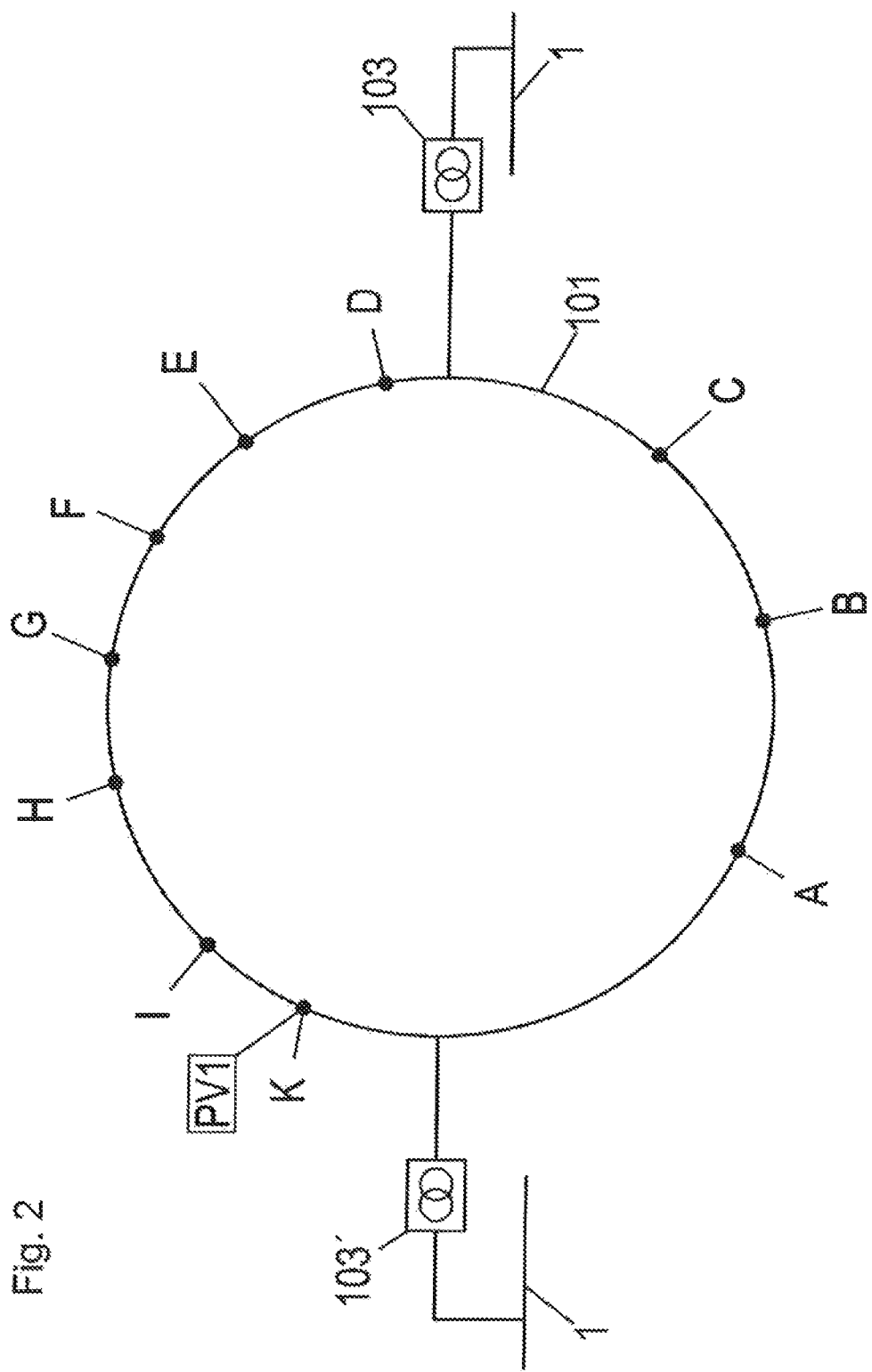
FIG. 2 is a schematic representation of a ring circuit with supply transformers and network connection points in order to describe the occurrence of network instabilities.

Shown in FIG. 1 is a scheme for regulating the cos phi through the inverter output voltage U; this scheme is used to advantage principally in modern PV systems, and is intended to facilitate understanding of the description below.

Two limit values $U_{min}$ and $U_{max}$ are provided, which generally should not be exceeded either negatively or positively. Located between these boundary limit values $U_{min}$ and $U_{max}$ is a linear control range A, which is delimited by two control limit values $U_{regel\ min}$ and $U_{regel\ max}$. In this region A, the installation is operated in a cos phi neutral manner, and solely real power is fed into the supply network. If the operating point of the inverter is located with its output voltage U in the range B between $U_{min}$ and $U_{regel\ min}$, then reactive power VAr (reactive amperes) is additionally delivered to the supply network.

In similar fashion, for an operating point of the inverter with an output voltage U in the range C between $U_{mar}$ and $U_{regel\ max}$, reactive power VAr is drawn from the supply network in addition to the feed-in of power. In this context, the operating point can be adjusted by means of semiconductor elements or switches, in particular IGBTs (Insulated Gate Bipolar Transistors) in the inverter, in particular by means of a so-called MPP (Maximum Power Point) controller. At the upper and lower limit values, there are also emergency edges which are not discussed further here.

Thus, depending on the operating point, a reactive power draw from the network occurs under certain circumstances, which in general means a tendency to reduce the network voltage, or else a reactive power injection, which is equivalent to an increase in voltage at the supply level at which the inverter is connected.

Figure 3:
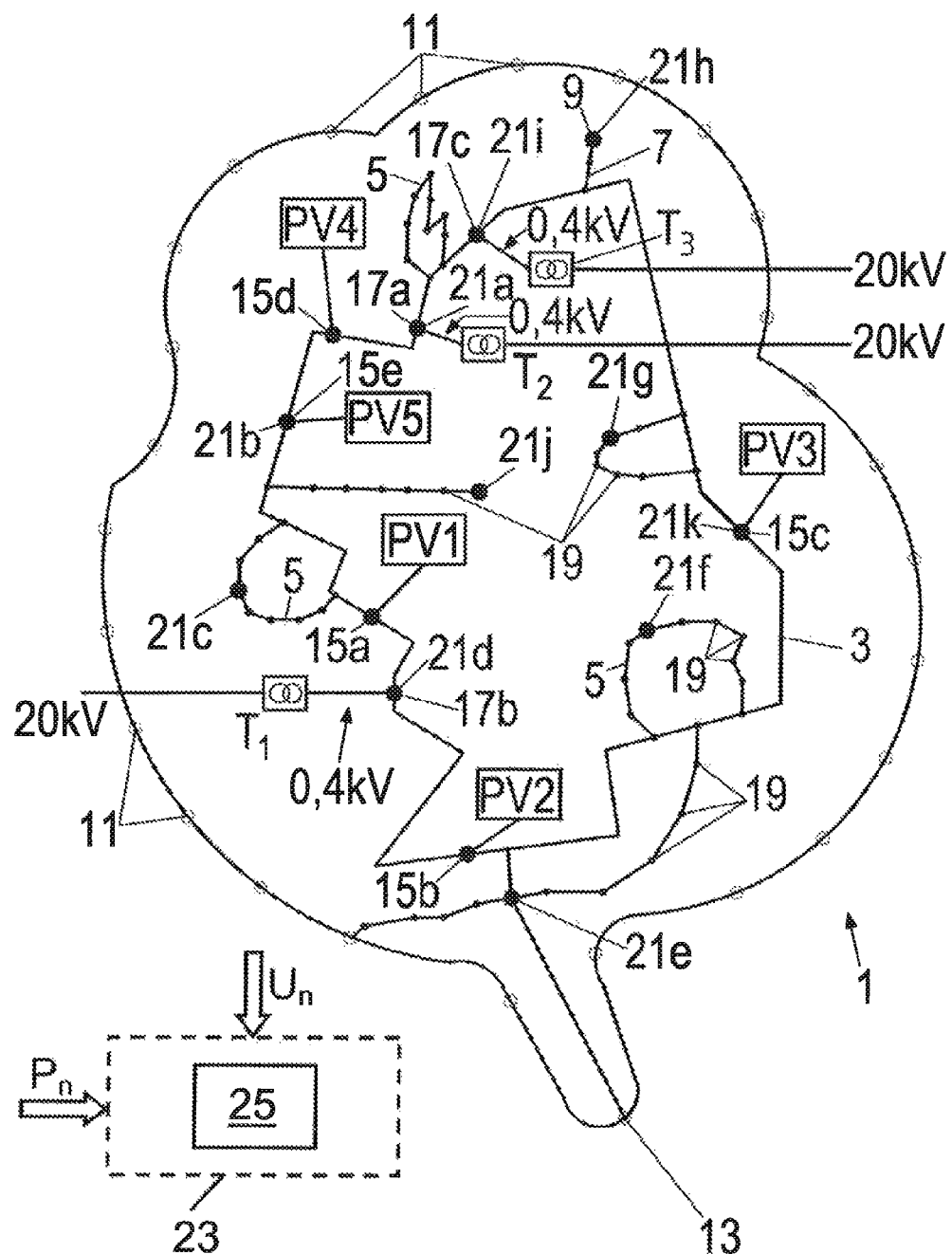
FIG. 3 is a schematic representation of a power supply network operated in accordance with the invention.

FIG. 3 schematically illustrates a public power supply network 1, hereinafter referred to as the supply network, for example of a relatively small city. The 0.4 kV level of the supply network 1 is fed from a 20 kV level by means of three transformers T1, T2, and T3. To this end, a main ring circuit 3 is provided that is installed within the city area, to which are connected three transformers T1, T2, and T3. Additional ring circuits are connected to the main ring circuit 3, of which only three ring circuits 5 are shown by way of example. The ring circuits 5 lead to housing developments, business districts, workshops, etc. A branch circuit 7 leads from the main ring circuit 3 to an industrial complex or relatively large factory 9, which is supplied with electric power directly from the main branch circuit 5.

The periphery of the supply network 1 is labeled with circles 11, which represent load points. The connecting lines between the circles 11 do not represent supply lines, but instead are intended only to illustrate the outer perimeter of the supply area. At the bottom edge of FIG. 1, an outlying load point, for example an agricultural operation 13, is connected to the supply network 1.

Five alternative power suppliers or generators in the form of photovoltaic systems PV1 through PV5 are each connected to the main ring circuit 3 through separate first network connection points 15a through 15e. The three transformers T1 through T3 each feed into the main ring circuit 3 through separate second network connection points 17a, 17b, 17c. In addition, a plurality of third network connection points 19 are provided, to each of which is connected a load point 11, 13, which may also be a building, a restaurant, a shop, or the like. All network connection points 15, 17, and 19 are marked with a small solid dot.

A large solid dot instead of a small solid dot symbolizes that the relevant network connection point 15a through 15e, 17a through 17c, and 19 not only performs its normal function, but in addition the currently prevailing voltage is measured at its connection so that these network connection points simultaneously serve as measurement points 21. These measurement points 21 are additionally numbered consecutively 21a through 21k to facilitate understanding of the description of how the method operates. A suitable tap as a means for measuring the voltage is the customary meter (metering device or meter box) of the load here. The measurement points 21a through 21k are distributed strategically throughout the supply network 1, which will be discussed in detail later.

At least for some of the measurement points 21a through 21i, their geographic location $P_n$, in particular their GPS (Global Positioning System) data, are supplied to an apparatus 23 with a regulating and control device or unit 25 for network stabilization, for example a control room, and are stored there and processed by means of the regulating and control device or unit 25. Thus, in each case a data pair $U_n$, $P_n$ formed of the measured voltage in the form of a corresponding voltage measurement $U_n$ and the place or geographic location $P_n$ where the measurement has taken place is present in the apparatus 23 or the control room. In a useful fashion, this procedure is performed in this way for all measurement points 21a through 21k. The index n here represents the relevant measurement points 21a through 21i, which in turn represent the relevant network connection points 15a through 15e, 17a through 17c, and 19 at which the voltages are measured. The regulating and control device or unit 25 is provided and configured to link the voltage measurements $U_n$ acquired by the means with the geographic location $P_n$ of the corresponding network connection points 15, 17, 19 and to calculate a reactive power draw or a reactive power delivery by the power generator PV on the basis of the linkages.

The most suitable geographic location is not determined by a fixed rule, but instead results from the electrical situation of the network at the time. For example, if a large consumer, such as the factory 9, is not on the network or if maintenance work is being performed on one of the transformers T1 through T3, for example, then different electrical conditions exist than would be the case with these network participants online. Suitability from a geographic standpoint means taking the measure at the location where the least effect on more distant loads or suppliers will result. A targeted change in the transformation ratio and a targeted injection or draw of reactive power should always take place in the "electrical" vicinity so as not to have to route the desired effect of, e.g., a voltage increase over a relatively long distance in the supply network 1.

With regard to how the method operates, some situations that arise by way of example are discussed below.

In a first exemplary situation, the factory 9 has an especially high power demand in the morning hours because furnaces must be heated or machinery or assembly lines must be started up. At the measurement point 21h, it is detected that the voltage is moving toward the lower limit value, and countermeasures must be taken. The geographically closest means for raising the voltage is the transformer T3. Its transformation ratio is changed such that the voltage at its network connection point 17c is raised, which also raises the voltage in the factory 9. However, this voltage increase could also have the result that the voltage at a different network connection point 19, for example the one that is simultaneously configured as measurement point 21g or 21f, is raised such that the voltage there approaches the upper limit value.

Located in the geographic vicinity of the measurement points 21g and 21f is the PV system PV3, which is then influenced by the control room so as to draw reactive power from the network and thus provide for a voltage reduction at the additional network connection points 19 associated with the measurement points 21g and 21f.

In a second exemplary situation taking shape at the third or additional network connection point 19 with the measurement point 21c, the voltage is approaching the upper limit value because the nearby PV system PV1 is feeding a high amount of power into the main ring circuit 3 at midday with a cloudless sky.

In the control room, the inverter of the PV system PV5, which likewise is nearby, can be modified in its operation in such a manner that, in addition to feeding power, it also draws reactive power from the supply network 1 and hence has a voltage-lowering effect on the measuring point 21c.

In a third exemplary situation, the voltage is decreasing at the network connection point 19 with the measurement point 21e. Based on the knowledge of the cable length to, for example, the farm 13 located several kilometers away, and the voltage drop associated with the length, the control room possesses the information that the voltage at the location of the farm 13 is approaching the lower limit value even though the voltage at the measurement point 21e is still acceptable.

As a reaction to this situation, on account of the photovoltaic system PV2 that is in a geographically advantageous location, influence can be brought to bear to have this PV system feed reactive power into the supply network 1 in order to ensure sufficiently high voltage at the location of the farm 13.

Also, the voltage can be measured, especially at the end of a branch circuit, such as at the measurement point 21j, in order to then choose the means with the location that is geographically most suitable, which is to say at what transformer T1 through T3 the transformation ratio should be changed, or which regenerative power generator should draw or feed in reactive power in order to stabilize the voltage there.

For reasons of clarity, only a few participants in the supply network 1 are shown, which, moreover, do not invariably serve as measurement points 21. The larger the number of measurement points 21 established in the power supply network 1, the more precise the method becomes.

In a suitable representation, the power supply network 1 can be displayed geographically on a screen. In doing so, the areas with an imminent undervoltage, areas with an imminent overvoltage, and also areas in the normal range preferably should be distinguished from one another by color. As a result, a map that changes in color at certain time intervals, for example once per second, should be generated and displayed from which the overall situation in the power supply network 1 is continuously apparent.

With a suitable learning program that evaluates and analyzes the measures taken for voltage stabilization, and hence for network stabilization, the process can be automated to the extent that automatic regulation of the control variables, in particular of the transformation ratio of the applicable transformer T1 through T3 and of the reactive power management, results.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for stabilizing network operation of an electric power supply network with a first network connection point at a power generator at a first voltage level, and with a second network connection point connected at a second voltage level through a transformer and with a plurality of third network connection points to particular associated loads, the method comprising:
   sensing a currently prevailing voltage as a voltage measurement at the first network connection point and at the second network connection point and at at least one of the third network connection points;
   ascertaining a geographic distance of the at least one of the third network connection points to the first network connection point;
   determining a reactive power to be drawn or to be delivered by the power generator so as to adjust the voltage at the at least one of the third network connection points in accordance with the ascertained geographic distance between the at least one of the third network connection points and the first network connection point and a voltage variation measured at the at least one of the third network connection points; and
   drawing or delivering the reactive power at the power generator based on the determined reactive power.

2. The method according to claim 1, wherein the power generator nearest to the at least one of the third network connection points is used for calculating reactive power draw or reactive power delivery when multiple power generators are present.

3. The method according to claim 1, wherein a geographic voltage diagram that is representative of the level of the voltage in the power supply network is generated using the voltage measurements, and wherein the delivery of reactive power or the draw of reactive power in the power supply network is regulated such that the voltage in the power supply network does not exceed or drop below a predefined or predefinable value at any network connection point.

4. The method according to claim 3, wherein information about a free capacity of the, or of every, power generator is used for delivering or drawing reactive power.

5. The method according to claim 3, wherein a transformation ratio between the voltage levels is changed and/or the power from the power generator is changed when the regulation of the delivery of reactive power or the draw of reactive power has been exhausted.

6. The method according to claim 3, wherein the draw and/or delivery of reactive power is controlled such that a reactive power transfer at the second connection point does not exceed a predefined or predefinable limit value.

7. A method for network stabilization of an electric power supply network, the method comprising:
   sensing a voltage at a first network connection point at a first voltage level to a power generator;

sensing a voltage at a second network connection point to a second voltage level through a transformer;

sensing a voltage at at least one third network connection point to a load, the voltage sensed at the first network connection point, the second network connection point and the at least one third network connection point are each sensed as a voltage measurement;

ascertaining a geographic distance of the at least one of the third network connection points to the first network connection point;

determining a reactive power to be drawn or to be delivered by the power generator so as to adjust the voltage at the at least one of the third network connection points in accordance with the ascertained geographic distance between the at least one of the third network connection points and the first network connection point and a voltage variation measured at the at least one of the third network connection points; and drawing or delivering the reactive power at the power generator based on the determined reactive power.

8. A device for network stabilization of an electric power supply network having a first voltage level, a second voltage level, a first network connection point to a power generator at the first voltage level, a second network connection point connected to the second voltage level through a transformer, and a plurality of third network connection points to particular associated loads, the device comprising:

a sensing component configured to sense a currently prevailing voltage at the first network connection point, at the second network connection point, and at at least one of the third network connection points; and a regulating and control unit configured to:

measure the voltage measurements sensed by the sensing component at the first network connection point and the second network connection point and at least one of the third network connection points, ascertain a geographic distance of the at least one of the third network connection points to the first network connection point, determine a reactive power to be drawn or to be delivered by the power generator so as to adjust the voltage at the at least one of the third network connection points in accordance with the ascertained geographic distance between the at least one of the third network connection points and the first network connection point and a voltage variation measured at the at least one of the third network connection points, and draw or deliver the reactive power from and to the power generator based on the determined amount of adjustment of the first voltage level.

9. The device according to claim 8, wherein multiple regenerative power generators having an inverter or a generator are provided that are connected to the power supply network through associated first network connection points.

10. The device according to claim 8, wherein multiple transformers to the second voltage level are connected to the power supply network through respectively associated second network connection points.

* * * * *